United States Patent
Hirasawa et al.

(10) Patent No.: US 10,346,111 B2
(45) Date of Patent: Jul. 9, 2019

(54) PRINT IMAGE PROCESSING DEVICE, PRINT IMAGE PROCESSING SYSTEM, AND DISPLAY METHOD OF PRINT IMAGE SELECTION SCREEN

(71) Applicant: SEIKO EPSON CORPORATION, Tokyo (JP)

(72) Inventors: Masahiko Hirasawa, Sapporo (JP); Satoru Nishio, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 107 days.

(21) Appl. No.: 14/799,111

(22) Filed: Jul. 14, 2015

(65) Prior Publication Data
US 2016/0019015 A1  Jan. 21, 2016

(30) Foreign Application Priority Data
Jul. 15, 2014  (JP) ................................ 2014-144801

(51) Int. Cl.
G06F 3/12  (2006.01)

(52) U.S. Cl.
CPC .......... *G06F 3/1256* (2013.01); *G06F 3/1205* (2013.01); *G06F 3/1206* (2013.01); *G06F 3/1211* (2013.01); *G06F 3/1218* (2013.01); *G06F 3/1254* (2013.01); *G06F 3/1285* (2013.01); *G06F 2206/1504* (2013.01)

(58) Field of Classification Search
CPC .................................................... G06F 3/1297
See application file for complete search history.

(56) References Cited

U.S. PATENT DOCUMENTS

| | | | |
|---|---|---|---|
| 2006/0256363 A1* | 11/2006 | Kayahara | H04N 1/00384 358/1.14 |
| 2007/0070407 A1* | 3/2007 | Katou | H04N 1/00132 358/1.15 |
| 2008/0068649 A1* | 3/2008 | Emori | G06F 3/1204 358/1.15 |
| 2012/0020694 A1 | 1/2012 | Shirata | |
| 2012/0062913 A1* | 3/2012 | Yabe | G06F 3/1208 358/1.9 |
| 2013/0208035 A1* | 8/2013 | Okumura | G01B 9/02 347/7 |

FOREIGN PATENT DOCUMENTS

| | | |
|---|---|---|
| JP | 2001-063189 | 3/2001 |
| JP | 2004-299286 A | 10/2004 |
| JP | 2010-157071 A | 7/2010 |
| JP | 2010-221440 | 10/2010 |
| JP | 2011-113180 A | 6/2011 |
| JP | 2012-043406 | 3/2012 |
| JP | 2013-163343 | 8/2013 |

\* cited by examiner

*Primary Examiner* — King Y Poon
*Assistant Examiner* — Michael Burleson
(74) *Attorney, Agent, or Firm* — Foley & Lardner LLP

(57) ABSTRACT

A print image processing device includes an input unit to which print conditions are input, a conversion unit (a printer driver) which converts image information into a print image, and a display unit which displays selection candidates (sample images) of the print image which is formed based on the input print conditions in a selectable manner.

13 Claims, 14 Drawing Sheets

FIG. 4

| PRINT PRODUCTION SETTINGS |||||||
|---|---|---|---|---|---|---|
| BASIC SETTINGS |||||||
| PRINTING APPARATUS NAME | PRINTER 990001 || PRINT MEDIUM NAME | PHOTO SHEET 880001 |||
| SIZE | LETTER PAPER || PRINT ORIENTATION | HORIZONTAL | LAYOUT | NONE |
| COLOR | FULL COLOR || PRINT QUALITY | RECOMMENDED | MARGINS | YES |
| ||| SCALE | 100% | NUMBER OF COPIES | 200 |

| PRINT UNIT COST | PRINT MEDIUM (JPY) | 300 | INK (JPY) | 135 |
|---|---|---|---|---|
| | PRINT COMPLETION SCHEDULED TIME | 24:00 | NECESSARY TIME (h) | 8.5 |

CONDITION SETTINGS

PRIORITY PARAMETER  1 [PRINT COST]  2 [INK USAGE]  3 [   ]  4 [   ]

☐ TOTAL PRINTING COST   UPPER LIMIT [450] JPY   TO LOWER LIMIT [400] JPY   NUMBER OF STEPS [3]

☒ INK COST   UPPER LIMIT [120] JPY   TO LOWER LIMIT [80] JPY   NUMBER OF STEPS [3]

DETAILED SETTINGS OF INK USAGE   (INK PROPERTIES)

☐ SPECIFY SINGLE COLOR   INK USED [BLACK: K]   [37] JPY

☐ SPECIFY IMAGE QUALITY   GRADATION [ORDINARY]   GRANULARITY [ROUGH]   DENSITY [ORDINARY]

☐ PRINTING TIME   UPPER LIMIT [8] h   TO LOWER LIMIT [5] h   NUMBER OF STEPS [3]

SPECIFY IMAGE [PERSON]   (SAMPLE IMAGE CHECK)   (RESTORE INITIAL VALUES)   (CANCEL)

FIG. 5

| INK PROPERTIES |||||
|---|---|---|---|---|
| PRINT UNIT COST | PRINT MEDIUM (JPY) | 300 → ☐ | INK (JPY) | 135 → ☐ |
| | PRINT COMPLETION SCHEDULED TIME | 24:00 → ☐ | NECESSARY TIME (h) | 8.0 → ☐ |

SPECIFY INK USAGE

→ CYAN: C [20] JPY
MAGENTA: M [15] JPY
YELLOW: Y [15] JPY
BLACK: K [10] JPY

PRIORITY USE ○ DO NOT USE ○ USAGE RATE (%) [100] LIGHT CYAN: LC [6] JPY
PRIORITY USE ○ DO NOT USE ○ USAGE RATE (%) [100] LIGHT MAGENTA: LM [8] JPY
PRIORITY USE ○ DO NOT USE ○ USAGE RATE (%) [100] LIGHT YELLOW: LY [15] JPY
PRIORITY USE ○ DO NOT USE ○ USAGE RATE (%) [100] GRAY: LK [4] JPY
PRIORITY USE ○ DO NOT USE ○ USAGE RATE (%) [100] LIGHT GRAY: LLK [5] JPY
PRIORITY USE ○ DO NOT USE ○ USAGE RATE (%) [100] WHITE: W [10] JPY
PRIORITY USE ○ DO NOT USE ○ USAGE RATE (%) [100] METALLIC: MT [27] JPY

SPECIFY PRIORITIZE BY CONSUMPTION OF REMAINING INK

| | REMAINING | DAYS UNTIL EXPIRY DATE | |
|---|---|---|---|
| ○ | ▨▨▨▨ | 120 DAYS | LIGHT CYAN: LC |
| ○ | ▨▨▨ | 39 DAYS | LIGHT MAGENTA: LM |
| ○ | ▨▨▨ | 89 DAYS | LIGHT YELLOW: LY |
| ○ | ▨ | 12 DAYS | GRAY: LK |
| ○ | ▨▨ | 246 DAYS | LIGHT GRAY: LLK |
| ○ | ▨▨▨ | 47 DAYS | WHITE: W |
| ○ | ▨▨▨▨ | 158 DAYS | METALLIC: MT |

( SAMPLE IMAGE CHECK ) ( RECALCULATE ) ( RESTORE INITIAL VALUES ) ( CANCEL )

FIG. 6

| COST COMPRESSION RATE | NUMBER OF INKS USED | USAGE RATE SUPPRESSION NUMBER | RESOLUTION COMPRESSION RATE | TRANSLATION TABLE A | TRANSLATION TABLE B | TRANSLATION TABLE C |
|---|---|---|---|---|---|---|
| 100 > Rc ≥ 90 | ALL | 2 | 100% | LUTa10 | LUTb10 | LUTc10 |
| 90 > Rc ≥ 80 | ALL | 4 | 100% | LUTa09 | LUTb09 | LUTc09 |
| 80 > Rc ≥ 70 | 8 | 4 | 100% | LUTa08 | LUTb08 | LUTc08 |
| 70 > Rc ≥ 60 | 6 | 2 | 100% | LUTa07 | LUTb07 | LUTc07 |
| 60 > Rc ≥ 50 | 6 | 2 | 81% | LUTa06 | LUTb06 | LUTc06 |
| 50 > Rc ≥ 40 | CMYK | — | 81% | LUTa05 | LUTb05 | LUTc05 |
| 40 > Rc ≥ 30 | CMYK | — | 64% | LUTa04 | LUTb04 | LUTc04 |
| 30 > Rc ≥ 20 | CMYK | — | 49% | LUTa03 | LUTb03 | LUTc03 |
| 20 > Rc ≥ 10 | K | — | 49% | LUTa02 | LUTb02 | LUTc02 |
| 10 > Rc | K | — | 25% | LUTa01 | LUTb01 | LUTc01 |

FIG. 7

| COST COMPRESSION RATE | NUMBER OF INKS USED | GRADATION (RGB) | RESOLUTION COMPRESSION RATE | TRANSLATION TABLE D | TRANSLATION TABLE E | TRANSLATION TABLE F |
|---|---|---|---|---|---|---|
| 100 > Rt ≥ 90 | ALL | 256 | 100% | LUTd10 | LUTe10 | LUTf10 |
| 90 > Rt ≥ 80 | ALL | 128 | 100% | LUTd09 | LUTe09 | LUTf09 |
| 80 > Rt ≥ 70 | 8 | 64 | 100% | LUTd08 | LUTe08 | LUTf08 |
| 70 > Rt ≥ 60 | 6 | 64 | 81% | LUTd07 | LUTe07 | LUTf07 |
| 60 > Rt ≥ 50 | 6 | 32 | 81% | LUTd06 | LUTe06 | LUTf06 |
| 50 > Rt ≥ 40 | CMYK | 32 | 64% | LUTd05 | LUTe05 | LUTf05 |
| 40 > Rt ≥ 30 | CMYK | 32 | 49% | LUTd04 | LUTe04 | LUTf04 |
| 30 > Rt ≥ 20 | K | 128 | 49% | LUTd03 | LUTe03 | LUTf03 |
| 20 > Rt ≥ 10 | K | 64 | 49% | LUTd02 | LUTe02 | LUTf02 |
| 10 > Rt | K | 64 | 25% | LUTd01 | LUTe01 | LUTf01 |

PRINT IMAGE PROCESSING DEVICE, PRINT IMAGE PROCESSING SYSTEM, AND DISPLAY METHOD OF PRINT IMAGE SELECTION SCREEN

BACKGROUND

1. Technical Field

The present invention relates to a print image processing device, a print image processing system, and a display method of a print image selection screen.

2. Related Art

With regard to an ink jet printer which serves as a printing apparatus, there has been progress in innovation in printing technology with image processing technology, and it has become possible to perform various modes of printing using various expression means on various print media. As a result, for example, ink jet printers are often used for medium format printers and large format printers. The medium format printers are designed for commercial uses corresponding to the creation of posters, signs, advertisements, wrapping paper, and the like. The large format printers are designed for industrial use and may be incorporated in a production line of a product. With this increased usage in medium and large format printers, in addition to the print quality, the cost of printing materials (the print media, the inks, and the like) which are procured as original materials or consumables, and the management of the time taken to print have become important.

JP-A-2001-63189 proposes a print control device capable of storing the unit cost of a consumable, and capable of calculating the print cost by calculating the usage amount of the consumable according to the edited content of a sheet to be printed. According to the device, since it is possible to easily and accurately calculate the print cost for each sheet, it is possible to reduce the print cost more efficiently.

However, in the print control device described in JP-A-2001-63189, it is possible to ascertain the print cost of a sheet while editing the sheet to be printed; however, there is a problem in that, in order to obtain a sheet of a desired print cost, it is necessary to repeat a process of trial and error of editing and checking the print cost which is displayed as a result. There is also a problem in that there is no information from which it is possible to make a selection by comparatively judging the merits and demerits of the editing of the overall sheet (for example, a list of a plurality of editing proposals and cost calculation results corresponding thereto is not displayed).

SUMMARY

The invention can be realized in the following forms or application examples.

Application Example 1

According to this application example, there is provided a print image processing device which includes an input unit to which print conditions are input, a conversion unit which converts image information into a print image, and a display unit which displays selection candidates of the print image which is formed based on the input print conditions in a selectable manner.

According to this application example, the print image processing device includes the input unit to which print conditions are input, the conversion unit which converts image information into a print image, and the display unit which displays selection candidates of the print image in a selectable manner. The selection candidates of the print image which are formed based on the input print conditions are displayed on the display unit in a selectable manner. Since the print image is configured by inputting the print conditions, it is not necessary to repeat a process of trial and error. Since the selection candidates of the print image which are formed based on the input print conditions are displayed, it is possible to easily perform the selection of the print image.

Application Example 2

In the print image processing device according to the abovementioned application example, the print conditions include a print cost at which it is possible to provide printing of the print image.

According to this application example, the print conditions include the print cost at which it is possible to provide the printing of the print image. In other words, the selection candidates of the print image which are formed based on the input conditions of the print cost are displayed on the display unit in a selectable manner. Therefore, it is possible to easily select the print image of the desired print cost without repeating a process of trial and error in which editing of the print image is performed until the print image of the desired print cost is obtained.

Application Example 3

In the print image processing device according to the abovementioned application examples, the print conditions include attribute information of inks which can be used in the printing of the print image.

According to this application example, the print conditions include the attribute information of the inks which can be used in the printing of the print image. In other words, the selection candidates of the print image which are formed based on the attribute information of the inks which can be used are displayed on the display unit in a selectable manner. Therefore, it is possible to easily select the desired print image without repeating a process of trial and error in which editing of the print image is performed based on the usable inks until the desired print image is obtained.

Application Example 4

In the print image processing device according to the abovementioned application examples, the print conditions include attribute information of printing apparatuses which can be used in the printing of the print image.

According to this application example, the print conditions include the attribute information of the printing apparatuses which can be used in the printing of the print image. In other words, the selection candidates of the print image which are formed based on the attribute information of the printing apparatuses which can be used are displayed on the display unit in a selectable manner. Therefore, it is possible to easily select the printing apparatus with which it is possible to obtain the desired print image without repeating a process of trial and error in which the printing is attempted using various printing apparatuses.

Application Example 5

In the print image processing device according to the abovementioned application examples, the print conditions include tolerable image quality information which tolerates a reduction in image quality of the print image.

According to this application example, the print conditions include tolerable image quality information which tolerates a reduction in the image quality of the print image. In other words, the selection candidates of the print image which are formed based on the tolerable image quality information which tolerates a reduction in the image quality of the print image are displayed on the display unit in a selectable manner. Therefore, it is possible to easily select the desired print image without repeating a process of trial and error in which editing of the print image is performed until the desired print image is obtained.

Application Example 6

In the print image processing device according to the abovementioned application examples, the tolerable image quality information includes information of at least one of gradation, granularity, and density of the print image.

As described in this application example, the tolerable image quality information includes information of at least one of gradation, granularity, and density of the print image.

Application Example 7

In the print image processing device according to the abovementioned application examples, a plurality of transformation tables in advance which convert the image information into a plurality of levels of print image according to the input print conditions is provided.

According to this application example, the print image processing device is provided with a plurality of transformation tables in advance which convert the image information into a plurality of levels of print image according to the input print conditions. Therefore, it is not necessary to construct a transformation table whenever necessary according to the input print conditions, and it is possible to easily convert the image information into the print image.

Application Example 8

In the print image processing device according to the abovementioned application examples, display conditions are input to the input unit, and the display conditions include information which specifies an order in which selection candidates of the print image are displayed on the display unit in a selectable manner.

According to this application example, the display conditions include information which specifies an order in which selection candidates of the print image are displayed on the display unit in a selectable manner. In other words, it is possible to perform display of the selection candidates of the print image in a more easy to select manner.

Application Example 9

According to this application example, there is provided a print image processing system which includes a print image processing device which is connected to a printing apparatus via a network, in which the print image processing device includes an input unit to which print conditions are input, a conversion unit which converts image information into a print image, and a display unit which displays selection candidates of the print image which is formed based on the input print conditions in a selectable manner.

According to this application example, the print image processing system includes a print image processing device which is connected to a printing apparatus via a network, and the print image processing device includes an input unit to which print conditions are input, a conversion unit which converts image information into a print image, and a display unit which displays selection candidates of the print image which is formed based on the input print conditions in a selectable manner. The sample images which are formed based on the input print conditions are displayed on the display unit of the print image processing device in a selectable manner. Therefore, it is possible to easily perform the selection of the print image to be printed by the printing apparatus which is connected via the network.

Application Example 10

According to this application example, there is provided a display method of a print image selection screen used when converting image information into a print image and printing the print image. The method includes displaying selection candidates of the print image which is formed based on the input print conditions in a selectable manner.

The display method of this application example is the display method of the print image selection screen used when converting the image information into the print image and printing the print image. According to this application example, the selection candidates of the print image which are formed based on the input print conditions are displayed in a selectable manner. Therefore, it is possible to easily perform the selection of the print image.

Application Example 11

In the display method of the print image selection screen according to the abovementioned application examples, the print conditions include at least one of a print cost at which it is possible to provide printing of the print image, attribute information of inks which can be used in printing of the print image, attribute information of printing apparatuses which can be used in the printing of the print image, and tolerable image quality information which tolerates a reduction in image quality of the print image.

According to this application example, the print conditions include at least one of a print cost at which it is possible to provide printing of the print image, attribute information of inks which can be used in printing of the print image, attribute information of printing apparatuses which can be used in the printing of the print image, and tolerable image quality information which tolerates a reduction in image quality of the print image. In other words, the selection candidates of the print image are displayed on the display unit in a selectable manner. The selection candidates are formed based on conditions such as the print cost, the attribute information of inks which can be used in the printing of the print image, the attribute information of the printing apparatuses which can be used in the printing of the print image, and the tolerable image quality information which tolerates a reduction in image quality of the print image. Therefore, it is possible to easily select the desired print image without repeating a process of trial and error in which editing of the print image is performed until the desired print image is obtained.

BRIEF DESCRIPTION OF THE DRAWINGS

The invention will be described with reference to the accompanying drawings, wherein like numbers reference like elements.

FIG. 4 is a diagram illustrating an example of a content settings screen of a print condition sheet.

FIG. 5 is a diagram illustrating an example of an ink properties screen.

FIG. 6 is a table listing set examples of transformation table LUTs corresponding to cases in which ink costs are specified.

FIG. 7 is a table listing set examples of transformation table LUTs corresponding to cases in which printing time is specified.

DESCRIPTION OF EXEMPLARY EMBODIMENTS

Hereinafter, description will be given of the embodiments that embody the invention with reference to the drawings. The following described an embodiment of the invention, and does not limit the invention.

Example 1

Print Image Processing System

Figure 1:
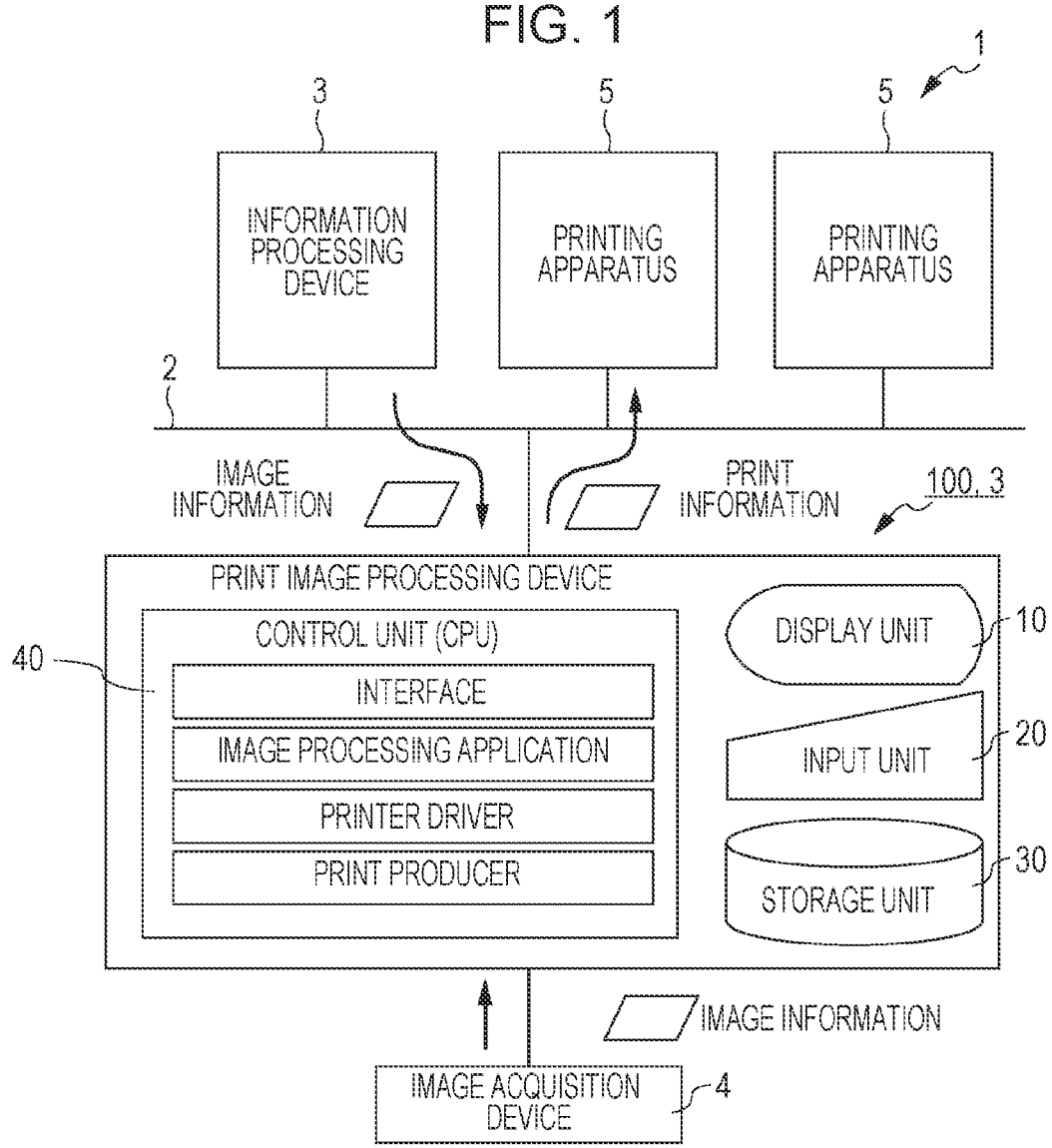
FIG. 1 is a block diagram schematically illustrating a print image processing system according to a first embodiment.

FIG. 1 is a block diagram schematically illustrating a print image processing system 1 according to the first embodiment.

The print image processing system 1 is an image processing system for printing image information which is obtained from various image acquisition devices 4 in a desired format from a printing apparatus 5 such as an ink jet printer which is connected to a network 2. Examples of the various image acquisition devices 4 include an information processing device 3 such as a personal computer which is connected to the network 2, a digital camera, and the like. The print image processing system 1 is configured to include a print image processing device 100 which is connected to the printing apparatus 5 via the network 2.

It is possible to use a wired or wireless LAN, the Internet, a public line, a private line, or the like as the network 2. In the print image processing system 1, it is possible to connect a plurality of the printing apparatuses 5 to the network 2.

The print image processing device 100 is an image processing device which converts the image information into print information for performing the desired printing, and which transmits a print request to the printing apparatus 5. For example, the print image processing device 100 may be configured using a personal computer which serves as one information processing device 3 which is connected to the network 2.

The print image processing device 100 is provided with a display unit 10, an input unit 20, a storage unit 30, a control unit 40, and the like.

The display unit 10 is an information display means (a display) which serves as a human interface, and, under the control of the control unit 40, information which is input from the input unit 20, an image based on the print information to be printed by the printing apparatus 5, or the like is displayed on the display unit 10.

The input unit 20 is an information input means which serves as a human interface, and is capable of inputting the print information and the like. Specifically, for example, the input unit 20 is formed of an information input device such as a keyboard, an information processing unit (depiction omitted) which transmits input information to the control unit 40, or the like.

The storage unit 30 is a re-writable recording medium such as a hard disk drive (HDD) or a memory card, and information such as software (program) which is run by the control unit 40, image information, a transformation table LUT (described later), and a unit cost table.

The control unit 40 is provided with a CPU (a computation unit), and a storage unit such as a RAM or a ROM (depiction omitted), and performs centralized control of the entire print image processing device 100. Specifically, the control unit 40 includes control functions of the display unit 10, the input unit 20, the storage unit 30, and the like in addition to functions of an interface, a general image processing application, a printer driver, a print producer, and the like. The interface performs the transfer of information via the network 2, the general image processing application is capable of processing the image information, the printer driver performs the drive control of the printing apparatus 5, and the print producer characterizes the present embodiment.

Print Image Processing Device

Figure 2:
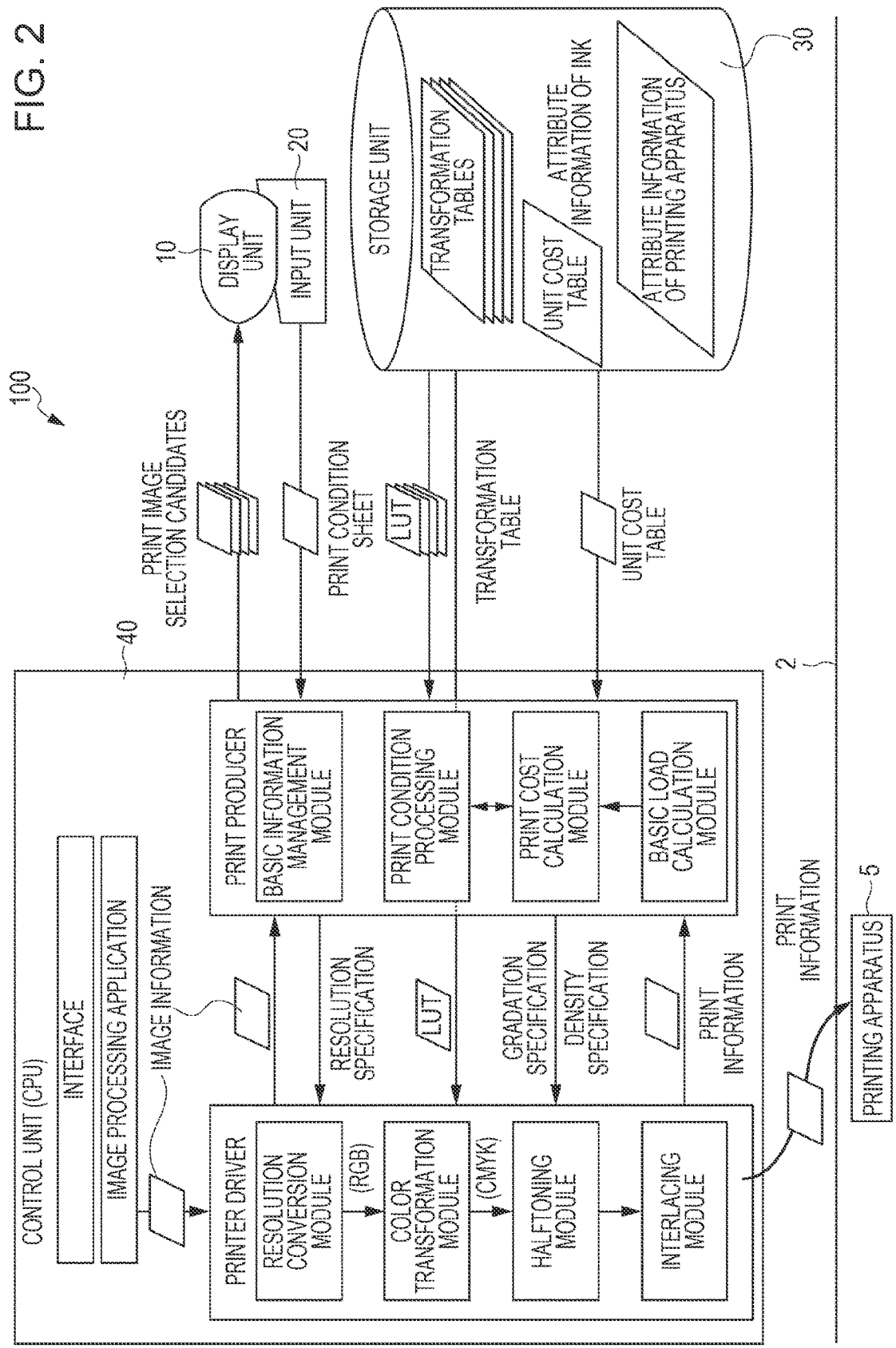
FIG. 2 is a block diagram schematically illustrating functions of a print image processing device according to the first embodiment.

FIG. 2 is a block diagram schematically illustrating functions of the print image processing device 100 according to the present embodiment.

The printer driver and the print producer are programs which are started from the image processing application when the image processing application performs the printing based on the image information. By cooperating with the printer driver, the print producer can control the printing apparatus 5 such that the printing is completed within the print cost and the printing time which are specified by the user.

Note that, in the following description, the printing apparatus 5 is used as the target of the ink jet printer. The ink jet printer forms an image on the print medium while changing the relative positional relationship between the print medium and the head on which nozzles are formed. For example, the ink jet printer forms an image on the print medium by alternately repeating a transport operation and a dot forming operation and forming rows of dots (dot rows) which line up in the scanning direction such that the dot rows line up in the transport direction. The transport operation causes the print medium such as paper or fabric to move in the transport direction, and the dot forming operation ejects ink droplets from the nozzles while causing the head in which the plurality of nozzles is formed to move by scanning in a scanning direction which intersects the transport direction of the print medium. Note that, the dot forming operation in which the head moves in the scanning direction while ejecting the ink will be referred to as a "pass".

Printer Driver

First, description will be given of the basic functions of the printer driver.

The printer driver includes a function as a conversion unit which converts image information into a print image, and is provided with a resolution conversion module, a color transformation module, a halftoning module, an interlacing module, and the like as functions which configure the conversion unit.

The resolution conversion module performs a process in which the image information (text data, image data, and the like) which is output from the image processing application is converted to image information of the resolution (print resolution) to be printed onto the print medium. For example, when 1440×720 dpi is specified as the print resolution, the vector format image information which is received from the image processing application is converted to image information of a resolution of 1440×720 dpi. Each item of pixel data of the image information which is obtained after the resolution conversion process is data indicating a gradation value of 256 grades in RGB color space.

Note that, the image indicated by the image information which is obtained after the resolution conversion is formed of pixels which are disposed in a matrix. Each pixel includes a gradation value of 256 grades in RGB color space. The pixel data which is obtained after the resolution conversion indicates the gradation values of the corresponding pixels.

The color transformation module performs a process in which the RGB color space data is transformed to CMYK color space data corresponding to the colors of the inks of the printing apparatus 5. For example, the pixel data which is obtained after the color transformation is data indicating the gradation values of 256 grades which is expressed using 10 dimensional color space of cyan (C), magenta (M), yellow (Y), black (K), light cyan (LC), light magenta (LM), gray (LK), light gray (LLK), white (W), and metallic (MT).

The color space transformation is performed using a transformation table LUT (lookup table) which correlates the coordinates of the respective color spaces.

The halftoning module performs a process in which the pixel data of 256 grades is converted to pixel data of 4 grades, which is the number of grades that the printing apparatus 5 is capable of forming. The pixel data of 4 grades which is obtained after the halftoning process is data indicating the size of the dots which form the corresponding pixels. Specifically, the data indicates one of "big dot", "medium dot", "small dot", or "no dot".

The interlacing module performs a process (a binarization process, array processing, or the like) in which the CMYK image information is replaced with dot information which actually causes the individual nozzles to eject.

The print information is generated by adding command data to the pixel data which is subjected to the interlacing process.

The printing apparatus 5 is driven according to the command data in the print information, and performs printing by forming dots on the print medium due to the ink being ejected from the nozzles according to the pixel data in the print information.

Print Producer

Next, description will be given of the print producer.

The print producer is a software program for editing the print information which is passed on to the printing apparatus 5 such that the printing is completed at the desired print cost with sufficient print quality and optionally within a desired time. A user interface is realized in which the user can easily judge the pros and cons of print samples (selection candidates of a print image (hereinafter referred to as sample images)) while viewing the print samples.

The print producer is provided with a basic information management module, a print condition processing module, a print cost calculation module, a basic load calculation module, and the like as functions.

Hereinafter, description will be given of each function module which the print producer is provided with.

Basic Information Management Module

The basic information management module performs the management of ink sets and transformation table LUT sets. The ink sets are associated with the printing apparatus 5, the printing apparatus 5, and the like which are the targets of the print image processing system 1, and the transformation table LUT sets are prepared in advance corresponding to each of the printing apparatuses 5.

Specifically, the basic information management module manages a series of tasks which manage the registration of the printing apparatus 5 which is connected to the print image processing system 1, registers the attribute information of the printing apparatus 5, acquires the attribute information of the inks, the transformation table LUT sets, and the like which are associated with the printing apparatus 5 from a service site of the maker of the printing apparatus 5 via the network 2, and registers (stores under the control of the basic information management module) the acquired information in the storage unit 30.

For example, the attribute information of the printing apparatus 5 is a parameter set indicating identification information (model, product name, device number, device identifier, and the like) from which it is possible to specify the printing apparatus 5, the presence or absence of options relating to printing functions and capabilities, the mechanical drive capabilities, and the like.

For example, the attribute information of the ink is information such as identifying information (ink name, part number, ink identifier) from which it is possible to specify the ink which is used, price information of the ink, and an expiry date of the ink.

The transformation table LUT set is a data set formed of a plurality of transformation table LUTs which are prepared in advance in order to perform a transformation corresponding to a format desired by the user. Detailed description will be given later.

The basic information management module performs the creation, registration, and management of a unit cost table of the materials which are consumed by the print image processing system 1. The materials which are consumed by the print image processing system 1 are specifically, for example, the print medium (the paper), the inks, and the like, and the prices (unit costs) thereof are registered (stored under the control of the basic information management module) in the storage unit 30 as a unit cost table. The price information of the inks which is obtained as the attribute information of the inks is reflected in the unit cost table as default values; however, the user can update the unit cost table at any time by writing the purchase unit cost of an occasion on which the user individually purchases the ink. When the printing apparatus 5 is specified, the unit cost table of the ink can be read as associated information of the unit cost table of the ink set which is used by the printing apparatus 5.

Print Condition Processing Module

The print condition processing module acquires information such as the print cost, the print quality, and the print deadline (the printing time) which are desired by the user, and reflects editing of the print information. Specifically, the print condition processing module performs the creation and registration management of a print condition sheet which describes the desire of the user, the analysis (fetching of the format which is desired by the user) of the created print condition sheet, creation and display to the display unit 10 of sample images which serve as selection candidates of the print image according to the content of the print condition sheet which is analyzed and fetched, the creation of the print information corresponding to the sample image which is selected by the user (the print conditions are passed on to the print driver), and the like.

In order to create the print information, the print condition processing module determines which processes to pass on to the printer driver from the analysis results of the print condition sheet. For example, when the specified conditions according to the print condition sheet specify the ink cost, the ink usage, or the image, the print condition processing module performs the specification of the transformation table LUT as a processing request to the color transformation module. When the specified conditions according to the print condition sheet involve a change in resolution due to the specification of the ink cost or the ink usage, or when the image quality or the printing time is specified, the print condition processing module performs the specification of the resolution, the gradation, the density, and the like in relation to the resolution conversion module, the halftoning module, and the interlacing module.

Basic Load Calculation Module

The basic load calculation module calculates the ejection amount of each ink and the number of passes of the printing which are necessary for the printing of the image which is the printing target by analyzing the print information. The necessary time for printing is calculated from the number of passes of the printing.

Print Cost Calculation Module

The print cost calculation module calculates the print cost based on information such as the information from the basic load calculation module and the attribute information (the unit cost table and the like) of the inks. For example, the ink cost which serves as the print unit cost is calculated from each the ejection amount of each ink and the respective unit costs thereof. The total printing cost, including the unit cost of the print medium, the necessary time cost of the printing, and the like is calculated.

Print Condition Sheet

Next, description will be given of the print condition sheet which is handled by the print condition processing module.

The print condition sheet is a data set which consolidates the desired information of the user in relation to the printing. The content settings screen of the print condition sheet is displayed on the display unit 10 when the print producer is started from the printer driver which is started when the printing processes is specified in the image processing application (for example, when a "print" button, a "print settings" button, or the like of an operation screen of the image processing application is pressed).

Figure 3:
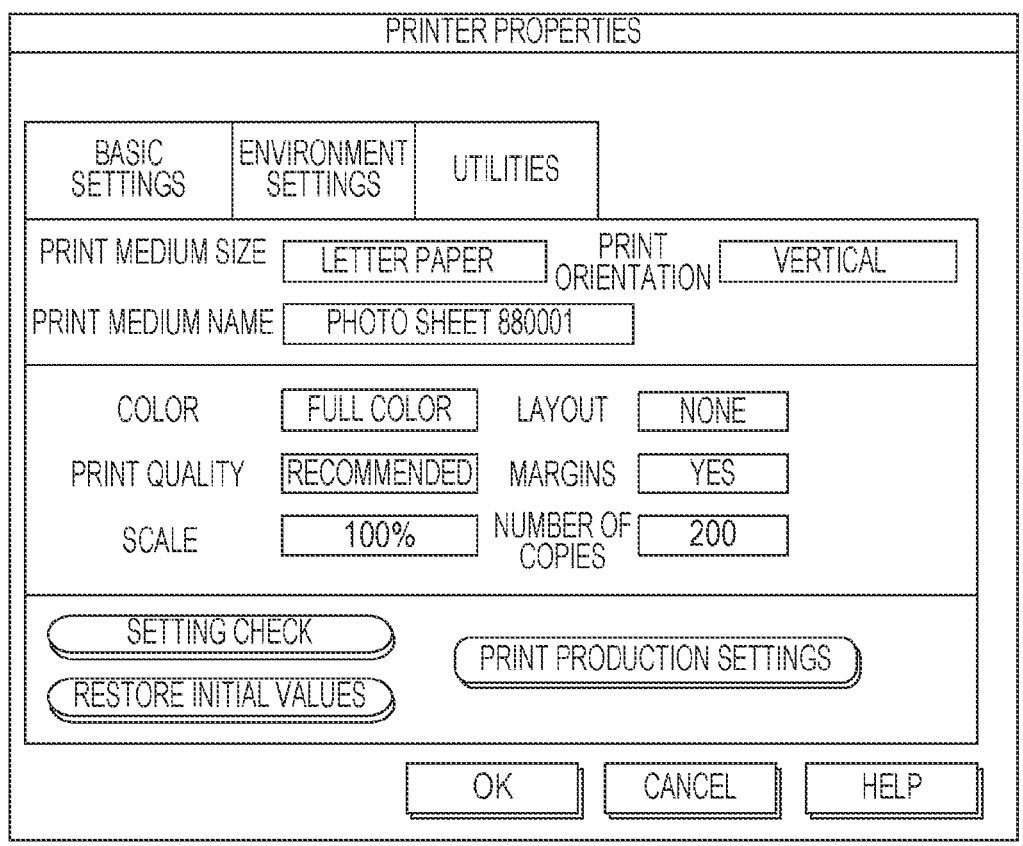
FIG. 3 is a diagram of a properties screen of a printer driver which starts a print producer.

FIG. 3 illustrates an example of the screen in which the print producer is started from the properties of the printer driver. This screen (the properties screen of the printer driver) can be opened from the screen of the printer driver which is started when the "print" button, the "print settings" button, or the like of the operation screen of the image processing application is pressed. In the properties screen of the printer driver, it is possible to set the general print format such as color (the selection of full color or single color), layout in the page, print quality (recommended, fine, ordinary, or the like), presence or absence of margins, scale, and the number of printed copies. The print producer is started by pressing the "print producer settings" button which is illustrated on the properties screen, and the screen of the print condition sheet settings is displayed.

FIG. 4 is a diagram illustrating an example of a content settings screen (hereinafter referred to as a print production settings screen) of a print condition sheet.

In the top portion (the basic settings region) of the print production settings screen, information such as basic information which is specified in the printer driver and the print unit cost which is derived from the basic information, the print completion scheduled time, and the necessary time is displayed, and in the bottom portion (the condition settings region), a screen provided with a window into which the user can input the desired format in relation to the printing in a re-writable manner is displayed.

Within the print unit cost displayed in the basic settings region, the unit cost of the print medium is looked up from the unit cost table of the print media which is managed by the basic information management module and is displayed. With regard to the ink unit cost, the print completion scheduled time, the necessary time, and the like, the information which is calculated by the basic load calculation module based on the information which is input using the properties screen of the printer driver illustrated in FIG. 3 is displayed.

Items which can be set in the condition settings region (items which specify the specific print format) include the specification of the print cost, the ink usage, the image quality, the printing time, the image, and the like. It is possible to specify the priority parameter as display conditions. The priority parameter is a specified priority and can specify the order of the sample images which are displayed based on the specified format.

The specification of the content in relation to the print condition sheet becomes applicable by inputting or selecting the specific values and information to a window in which it is possible to check check-boxes, and input or specify parameters.

The specification of the print cost is a specification which ensures that the printing is performed within a specified cost range. The print cost can specify the total printing cost including the cost of the print medium, the necessary time cost, and the like, or only the cost of the ink. The specified input information is, for example, the cost upper limit and lower limit, and the number of steps. The number of steps is the number of candidate sample images illustrated within the specified conditions, and when the number of steps is not specified (when left as default), for example, three sample patterns, top, bottom, and intermediate, are output.

The specification of the ink usage is a specification which ensures that the printing is performed within a specified ink usage range. It is possible to perform the specification of the types of ink to be used, the amount of ink to be used (the usage rate), priority use, and the like as the specification of the ink usage. Within the specification of the types of ink to be used, the specification of the single color can be performed by selecting the color from a pull-down menu which is displayed in the input window, for example, in the screen (the condition settings screen). By pressing the "ink properties" button as the detailed settings of the ink usage and transitioning to the detailed settings screen (the ink properties screen, described later), the specification relating to the plurality of inks can be performed on the screen.

The specification of the image quality is a specification of the specified gradation, granularity, and density at which the printing is performed. The specification includes tolerable image quality information which tolerates a reduction in the image quality of the print image. Each of several patterns of candidates is prepared in advance, and is specified by being selected from a pull-down menu. For example, with regard to the gradation, it is possible to specify using a selection from "not specified", "high", "ordinary", and "low", with regard to the granularity, it is possible to specify using a selection from "not specified", "high definition", "ordinary", and "rough", and in regard to the density, it is possible to specify using a selection from "not specified", "dense", "ordinary", and "sparse".

When some or all items of gradation, granularity, and density are set to "not specified" in "specify image quality" (that is, with the check-box of "specify image quality" checked), sample images for each level (three levels of high, ordinary, and low), each of which is prepared in advance, are displayed on the display unit 10, and it is possible to view and select the sample images.

The specification of the printing time is a specification which ensures that the printing is performed in a shorter time than the necessary printing time in the basic settings. The specified input information is, for example, the printing time upper limit and lower limit, and the number of steps.

The term "specify image" specifies that the printing is performed using the most appropriate conceivable color balance in relation to the specified image. For example, it is possible to specify the image by selecting from among "not specified", "person", "landscape", and the like.

Note that, each of the specifications described above can be specified multiple times as long as there is no contradiction. In this case, the specified order of priority is specified as the priority parameter. For example, when the inks to be use are limited, the upper and lower limits of the ink cost are specified, and the user wishes to display the sample images, the priority parameter is set such that the ink usage is first and the print cost is second.

When the condition setting is completed and the "sample image check" button is pressed, the sample images are displayed on the display unit 10 according to the specified conditions.

Ink Properties

FIG. 5 is a diagram illustrating an example of a detailed settings screen (the ink properties screen) which is displayed when the "ink properties" button on the print production settings screen illustrated in FIG. 4 is pressed. In this screen, it is possible to perform detailed specification in relation to the ink usage.

In the ink properties screen, it is possible to perform the specification of the ink usage in relation to inks other than cyan (C), magenta (M), yellow (Y), and black (K). It is possible to specify whether or not each ink is used, the usage rate when the ink is used, whether the ink is for priority use, and the like in relation to each ink of light cyan (LC), light magenta (LM), light yellow (LY), gray (LK), light gray (LLK), white (W), and metallic (MT). With priority use, it is possible to perform setting such that even if an ink has a high cost the ink will be used with priority, to perform setting such that the remaining ink is consumed with priority without the amount being insufficient in the target print job (printing of a specified number of copies), and the like.

The print unit cost (the basic unit cost) in the basic settings is displayed in the region of the top portion of the ink properties screen. When the usage rates of the inks are changed using the ink properties screen and the bottommost "recalculate" button is pressed, the print unit cost of the inks for which the usage rate is changed is displayed adjacent to the basic unit cost on the right side thereof so as to be comparable.

It is possible to specify that each ink is not used, is used with priority, or the like by selecting a radio button in the ink usage specification region, which is the second region from the top, in relation to each ink of light cyan (LC), light magenta (LM), light yellow (LY), gray (LK), light gray (LLK), white (W), and metallic (MT). The print unit cost of each of the inks is displayed on the right side of each ink name. The specification of the usage rate of the ink is a setting which changes the usage amount in the target printing, and for example, when 50% is specified, the usage amount and the print unit cost of the ink in the printing are halved. However, with this setting, there is a case in which the ink usage amount of one of the complementary colors of cyan (C), magenta (M), yellow (Y), and black (K) increases in order to maintain the ink usage in a specified range.

When the necessary ink usage specification is completed and the "recalculate" button is pressed, the print unit cost which is displayed on the right side of each ink name is recalculated and displayed.

It is possible to specify that each ink is prioritized for use by consumption of the remaining ink by selecting a radio button in the specify prioritize by consumption of remaining ink region, which is the third region from the top, in relation to each ink of light cyan (LC), light magenta (LM), light yellow (LY), gray (LK), light gray (LLK), white (W), and metallic (MT). An indicator of each remaining ink and the remaining number of days until the expiry date are displayed on the left side of each ink name. For example, in order not to render an ink for which the expiry date is approaching the target of wasteful disposal, by selecting the radio button of the ink, it is possible to use the ink with priority. The specification of prioritize by consumption of remaining ink differs from the specification of priority use in that when the ink reaches the expiry date, the effect of the priority specification is nullified, and an alert encouraging re-specification is emitted.

Note that, the remaining amount information of the ink can be acquired from the printing apparatus 5 which is connected to the network 2 via the printer driver whenever necessary.

When the condition setting in the ink properties screen is completed and the "sample image check" button is pressed, the sample images are displayed on the display unit 10 according to the specified conditions.

Transformation Table LUT Sets

FIG. 6 illustrates example transformation table LUT sets corresponding to cases in which ink costs are specified.

Methods of reducing the cost of the inks include methods such as reducing the ink discharge amount, increasing the discharge ratio of inks with an inexpensive unit cost instead of inks with a high unit cost. Where the ratio of a cost C1 of a cost-reduced ink to a basic ink cost C0 is a cost compression rate Rc (=C1/C0), it becomes possible to more easily perform printing at a desired cost by preparing a plurality of transformation table LUTs corresponding to the cost compression rate Rc in advance. The cost compression rate Rc is calculated while the print condition processing module performs the analysis of the input print condition sheet.

The table illustrated in FIG. 6 illustrates the number of inks used, a usage rate suppression number of the inks which are used, a resolution compression rate, and a transformation table LUT which corresponds to these values, which realize the cost compression rate Rc. For example, when the cost compression rate is high at 90% or greater (that is, the rate by which the cost is reduced is comparatively low), all of the inks are usable, and this is handled by reducing the usage rate of the two types of ink which are comparatively expensive. In this case, LUTa10, LUTb10, and LUTc10 correspond as the transformation table LUTs. For example, when the cost compression rate is low at less than 20% (that is, the rate by which the cost is reduced is high), the ink usage is limited to the inexpensive black (K), and the corresponding transformation table LUTs (LUTa02, LUTb02, LUTc02, LUTa01, LUTb01, and LUTc01) are selected. When the cost compression rate is comparatively low (that is, when the cost reduction rate is comparatively high), it becomes necessary to reduce the gradation, or to reduce the resolution of the image information. In this case, the resolution conversion module and the halftoning module also perform support (support in which the resolution or the gradation is reduced) in addition to the support which is performed by the transformation table LUT (support by the color transformation module).

In the table illustrated in FIG. 6, the transformation tables A, B, and C are transformation tables corresponding to the image specifications described above by changing the color balance at the same cost compression rate. For example, the transformation tables A, B, and C are settings which can be used to perform the appropriate transformation when the image specification is not performed, when the image specification is set to "person", and when the image specification is set to landscape, respectively.

In this manner, when the items specifying the print format specify the ink, cost, the ink usage, and the image, since it is possible to perform the desired printing using the corresponding transformation table LUT, it is preferable to evaluate, in advance, the transformation table LUT sets which are prepared in advance and prepare many versions corresponding to the desired format such that detailed support is possible.

FIG. 7 illustrates example transformation table LUT sets corresponding to cases in which printing time is specified.

A reduction in the printing time can be achieved by performing a method in which the number of passes of the printing is reduced while reducing the image quality such as the resolution, the gradation, or the like, and the degree of suppression of printing irregularity within a tolerable range, or a method of increasing the movement speed of the carriage or the print medium while reducing the precision within a tolerable range.

The example illustrated in FIG. 7 illustrates the correspondence of the number of inks used, the gradation, the resolution, and the corresponding transformation table LUTs when the time taken is reduced by reducing the number of inks used or reducing the gradation or resolution.

Where the ratio of a compressed printing time T1 to a necessary printing time (basic time) T0 in the basic settings is a time compression rate Rt (=T1/T0), it becomes possible to more easily perform printing within a desired printing time by preparing a plurality of transformation table LUTs corresponding to the number of inks used, the gradation, and the resolution for obtaining the time compression rate Rt in advance. The time compression rate Rt is calculated while the print condition processing module performs the analysis of the input print condition sheet.

For printing within a desired printing time, support is also performed by the resolution conversion module and the halftoning module (support in which the resolution and the gradation are reduced) in addition to the support using the transformation table LUT (the support performed by the color transformation module).

Next, description will be given of the transformation table LUT when the ink usage is specified. For the ink usage, since it is possible to change the proportion of the usage amount from 0% to 100%, when transformation table LUTs are prepared in advance for the corresponding combination of usage amounts, it is desirable to allow the staged setting of the variation in the usage amounts of the inks. For example, transformation table LUTs for which the optimal (appropriate) color transformations are performed are prepared for all of the color combinations of cases in which each color except for the basic 4 colors, CMYK, is changed in 10% increments.

Alternatively, a method may be adopted in which the transformation table LUTs are created according to the specified content whenever necessary instead of preparing the transformation table LUTs in advance. Specifically, a method may be adopted in which algorithms are prepared to correspond to the four basic colors CMYK of cases in which each color except for the basic four colors CYMK is individually varied between 0% and 100%.

Display of Sample Images

Figure 8:
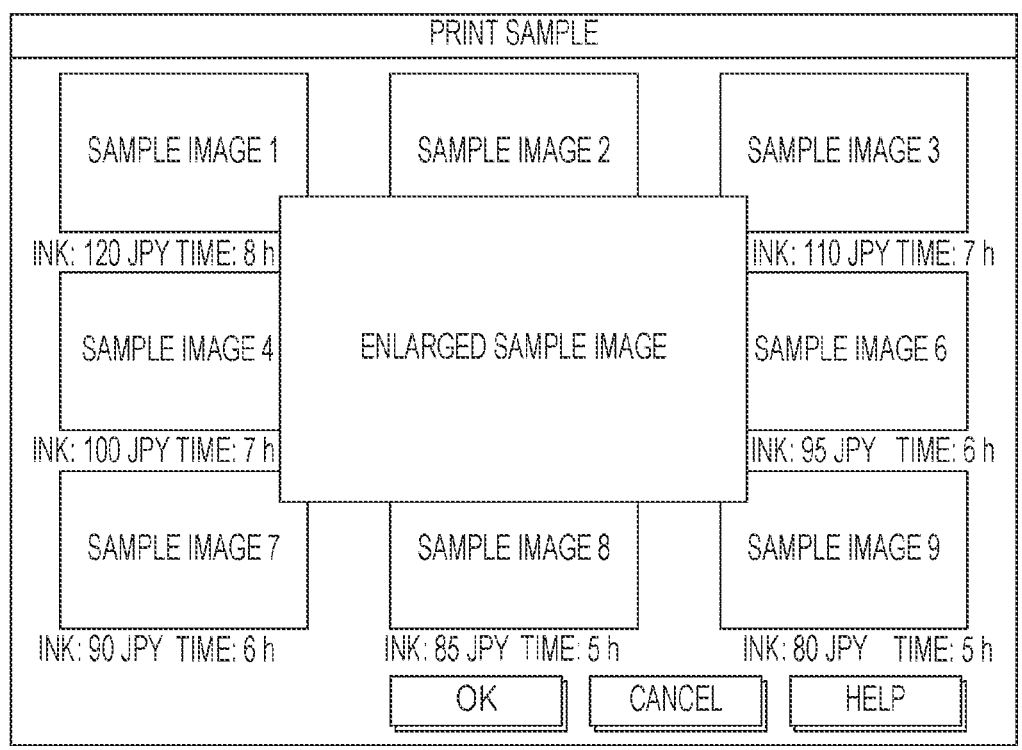
FIG. 8 is a diagram illustrating an example of a print image selection screen (a sample image display screen) according to the first embodiment.

FIG. 8 is a diagram illustrating an example of a sample image display screen which serves as a print image selection screen which is displayed on the display unit 10.

When the condition setting in the print production settings screen illustrated in FIG. 4 is completed and the "sample image check" button is pressed, corresponding sample images are generated, an a screen thereof is displayed.

The sample images which are displayed on the screen are created based on a transformation table LUT, a resolution conversion module, and a halftoning module which convert the images according to the specified conditions. Therefore, the baseline number of sample images is determined according to the specified number of steps. In the example of FIG. 8, corresponding to the number of steps being nine, nine sample images are displayed with the information of the ink cost and the necessary time.

Note that, when the ink single color specification is performed in the condition setting in the print production settings screen illustrated in FIG. 4, or when the condition setting of the ink properties illustrated in FIG. 5 is performed, one image is displayed for checking.

Since when the number of sample images which are displayed in the same screen becomes many, the sample images become small in size and this causes problems in selection determination, for example, as illustrated in the center of FIG. 8, the user can double click the sample image or the like to view the individual sample images enlarged.

The selection is completed by sample images being checked and compared, the sample image which matches the desires of the user is (clicked or the like and) specified, and pressing an "OK" button. By returning to the initial screen of the printer driver and executing the printing on this screen, the print information in which the specification result is reflected is transmitted to the desired printing apparatus 5, and the desired printed object is output. The specification result which is reflected in the print information is, among the parameters which are specified in the print condition sheet, the parameters which configure the sample image which is finally selected.

When the sample images are checked and compared and a sample image which matches the desires of the user is not obtained, a "cancel" button is pressed, and the process returns to the previous screen (the print production settings screen or the ink properties screen).

Figure 9:
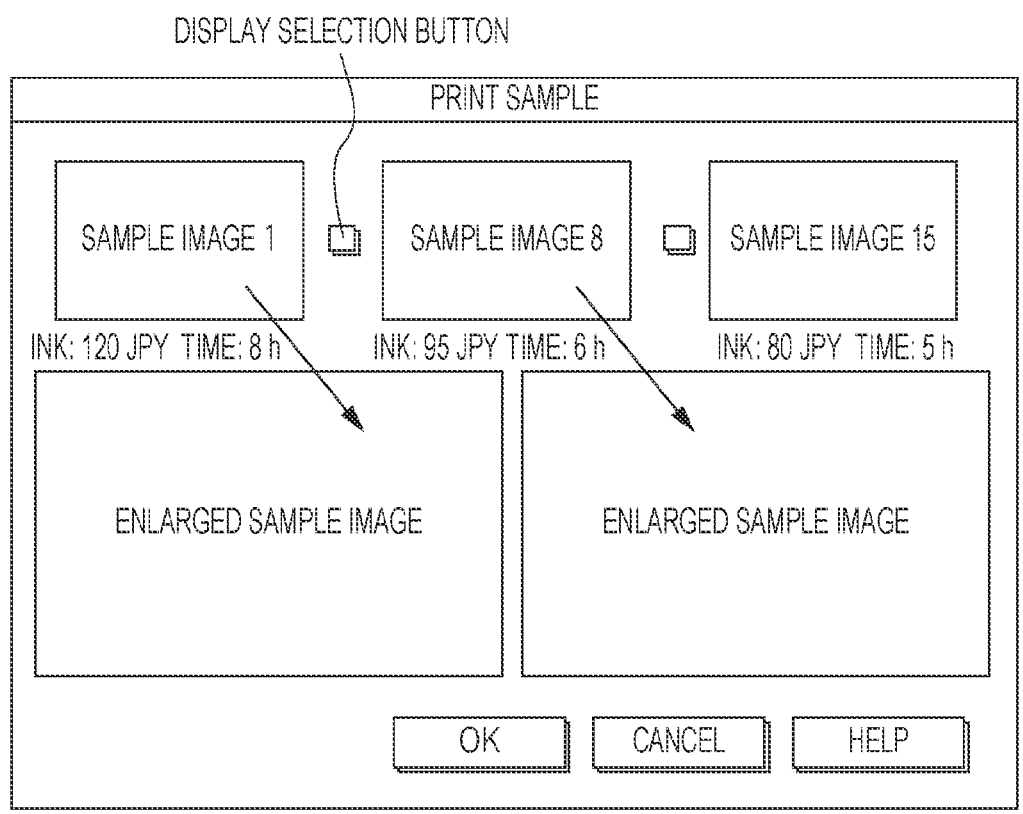
FIG. 9 is a diagram illustrating another example of a sample image display screen.

FIG. 9 is another example of a diagram illustrating an example of sample images which are displayed on the display unit 10. For example, FIG. 9 illustrates a display method which is effective when the number of sample images does not fit in one screen or the like.

For example, when 15 sample images, sample image 1 to sample image 15, are created, the sample image 1 which is one end (for example, the upper limit of the specified condition) is displayed on the left end in the top portion region of the display unit 10, and the sample image 15 which is the other end (for example, the lower limit of the selected condition) is displayed on the right end in the top portion region. The sample image 8 which is the intermediate condition is displayed in the center of the top portion region. It is possible to perform a detailed comparison by displaying an enlarged version of each of the sample images in the bottom portion region of the display unit 10. By pressing the display selection buttons which are between each of the sample images, it is possible to change the range of the sample images to display. For example, when the display selection button which is between the sample image 1 and the sample image 8 is pressed, the sample image 8 is displayed in the position of the sample image 15, and an image (for example, the sample image 5) which is based on the intermediate print information of the sample image 1 and the sample image 8 is displayed in the position of the center sample image 8. By repeating this process, it is possible to display the sample images of the direction which more closely matches the desires of the user. Note that, an image based on print information which is similar to the print information of either the sample image 1 or the sample image 8, and a configuration may be adopted in which it is possible to change the image using a scroll bar or the like to approach the print information of either the sample image 1 or the sample image 8 while viewing the displayed image.

Note that, the sample image which is displayed on the display unit 10 is image information which is converted to be possible to display on the display unit 10 based on the print information which is printed within the range of specified conditions. In other words, since it is difficult to display the result of subjecting the image information of the CMYK system to halftoning and an interlacing process on the display unit 10 as it is, the print producer uses an image conversion processing module (depiction omitted) to re-convert the print information to be possible to display on the display unit 10, and displays the sample image.

Execution Flow of Printing

Next, description will be given of the operations of the print condition processing module until the display and the printing of the sample images which are based on the specified print format, with reference to the flowcharts illustrated in FIGS. 10 to 14.

Figure 10:
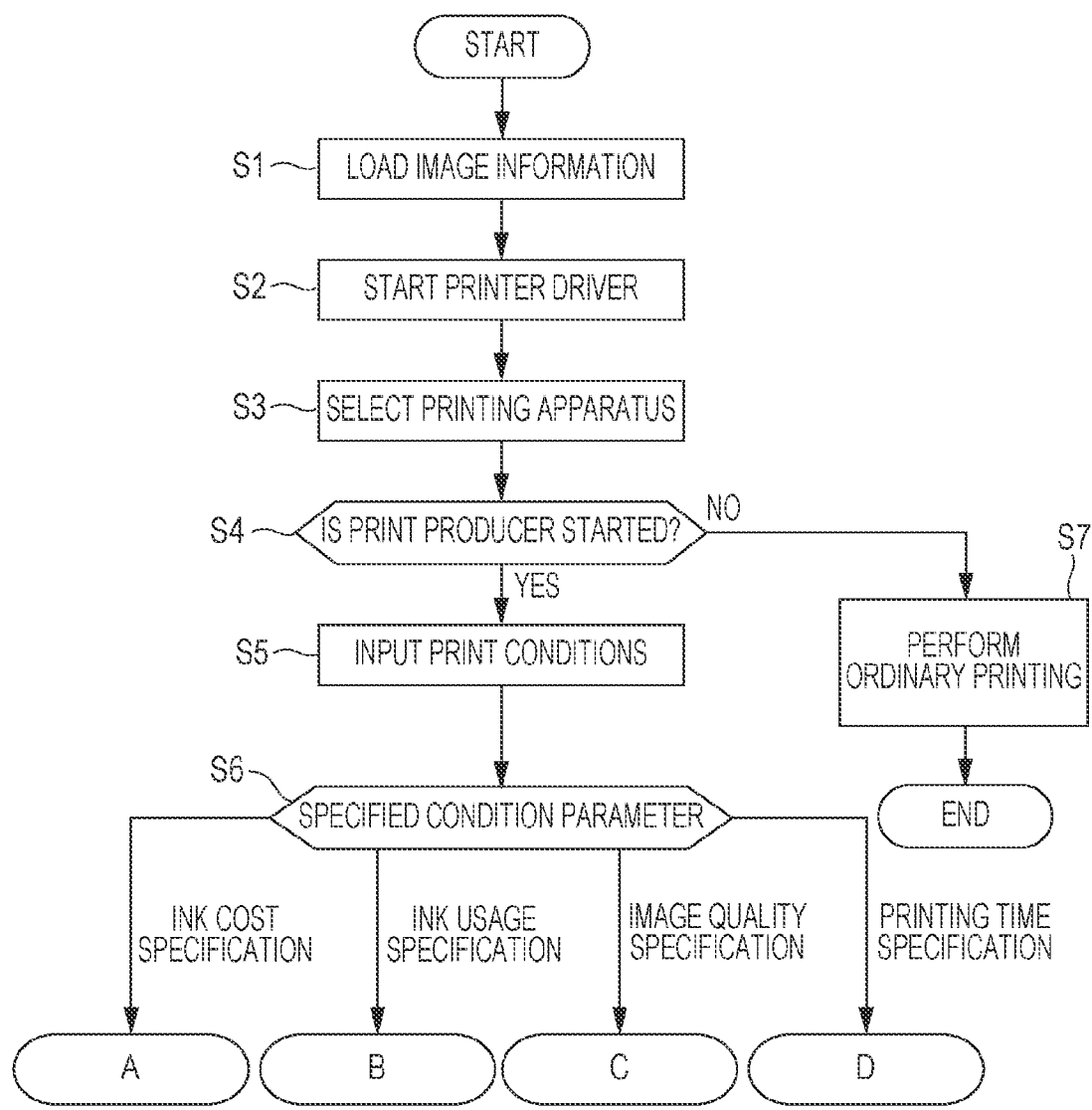
FIG. 10 is a flowchart illustrating processes from when image information is loaded until the setting of print conditions is started.

FIG. 10 is a flowchart illustrating processes from when image information is loaded by the image processing application until the print producer is started and the content settings of the print condition sheet are started.

First, the image processing application is started and the image information of the printing target is loaded (step S1).

Next, the process transitions to the printing processes after performing the necessary image processing (for example, trimming, contrast changes, and the like) in the image processing application. Specifically, for example, the "print" button or the "print settings" button of the operation screen of the image processing application is pressed, and the printer driver of the printing apparatus 5 which is specified as the default is started (step S2). Here, when it is necessary to change the printing apparatus 5, the selection of the printing apparatus 5 is performed (step S3), the printer driver of the printing apparatus 5 with which the user desires to perform the printing is started, and the properties screen (refer to FIG. 3) is opened.

Next, when the print producer is started, the "print production settings" button is pressed, and the print producer is started (step S4).

When it is not necessary to edit the print information using the print producer, the "OK" button on the properties screen of the printer is pressed, and the ordinary printing is performed from the printer driver (step S7).

When the print producer starts and the print production settings screen (refer to FIG. 4) is displayed, the necessary print conditions are input (step S5).

Figure 11:
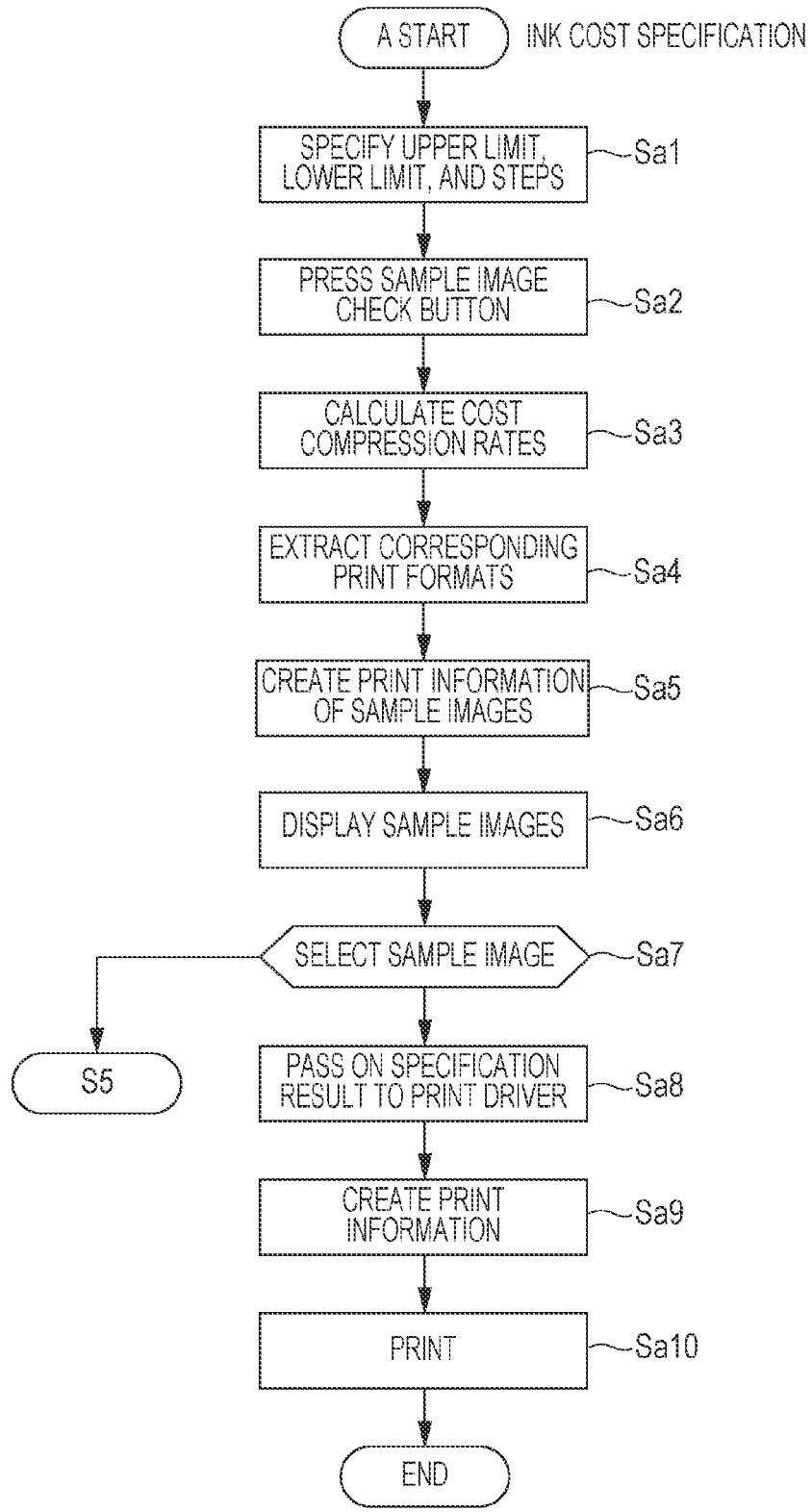
FIG. 11 is a flowchart illustrating printing processes when print cost is specified as a print condition.

Here, when the setting content of the print condition is specified as the print cost, that is, when the check-box of the total printing cost or the ink cost is checked and the print cost is specified as the first priority of the priority parameter, the process proceeds to process A illustrated in FIG. 11.

Figure 12:
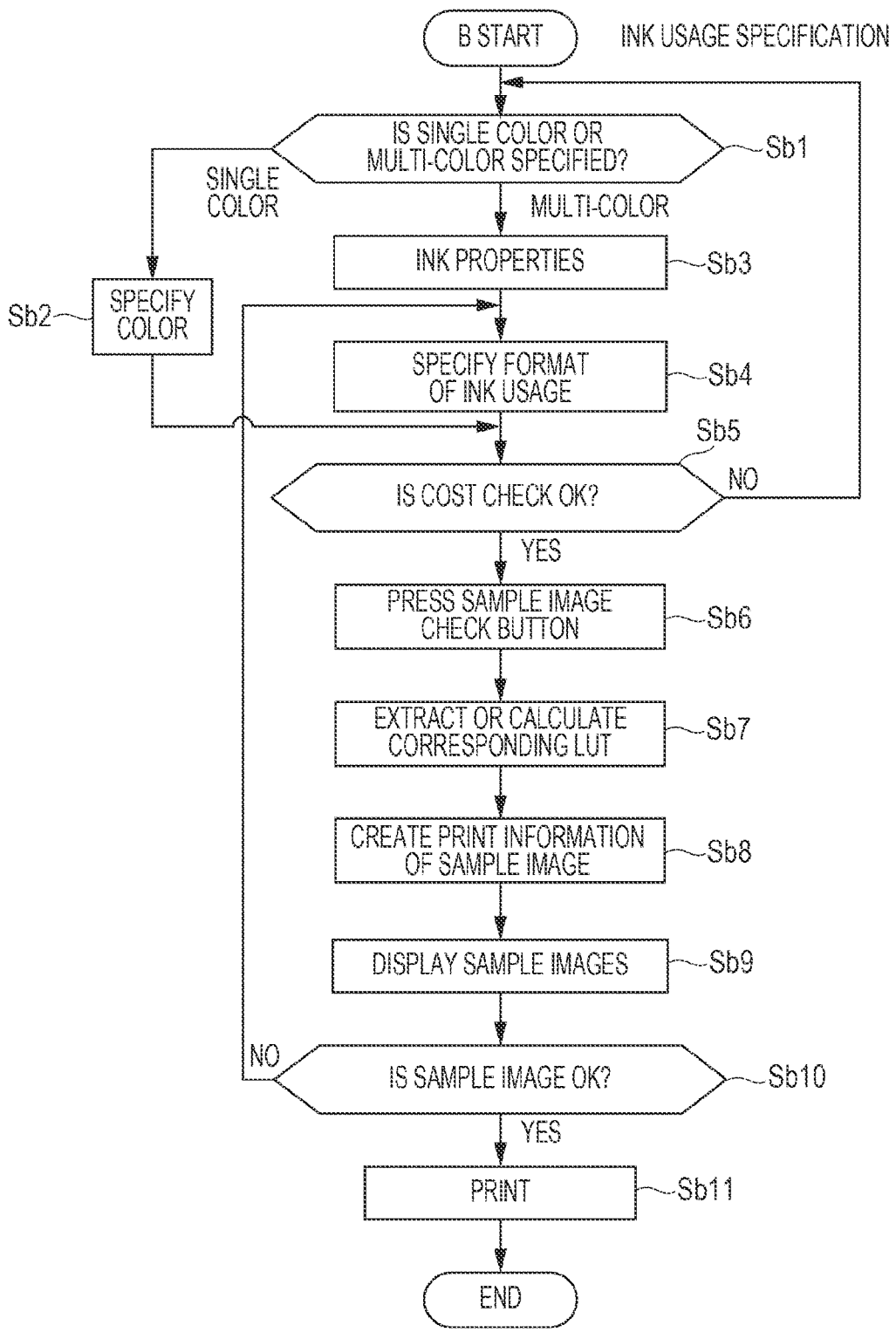
FIG. 12 is a flowchart illustrating printing processes when ink usage is specified as a print condition.

When the setting content of the print condition is specified as the ink usage, that is, when the "ink properties" button is pressed or when the "specify single color" check-box is checked and the ink usage is specified as the first priority of the priority parameter, the process proceeds to process B illustrated in FIG. 12.

Figure 13:
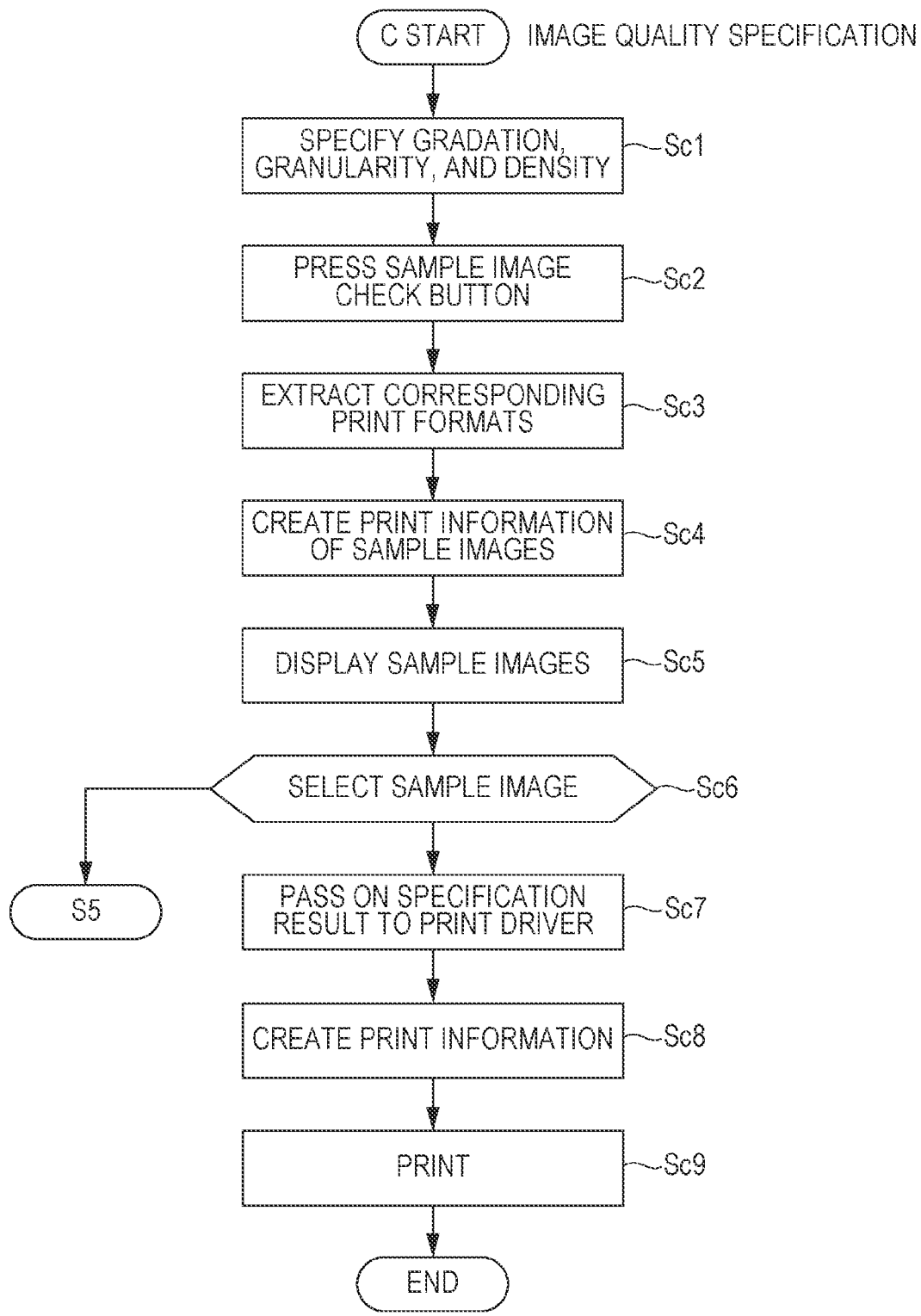
FIG. 13 is a flowchart illustrating printing processes when image quality is specified as a print condition.

When the setting content of the print condition is specified as the image quality, that is, when the "specify image quality" check-box is checked and the image quality is specified as the first priority of the priority parameter, the process proceeds to process C illustrated in FIG. 13.

Figure 14:
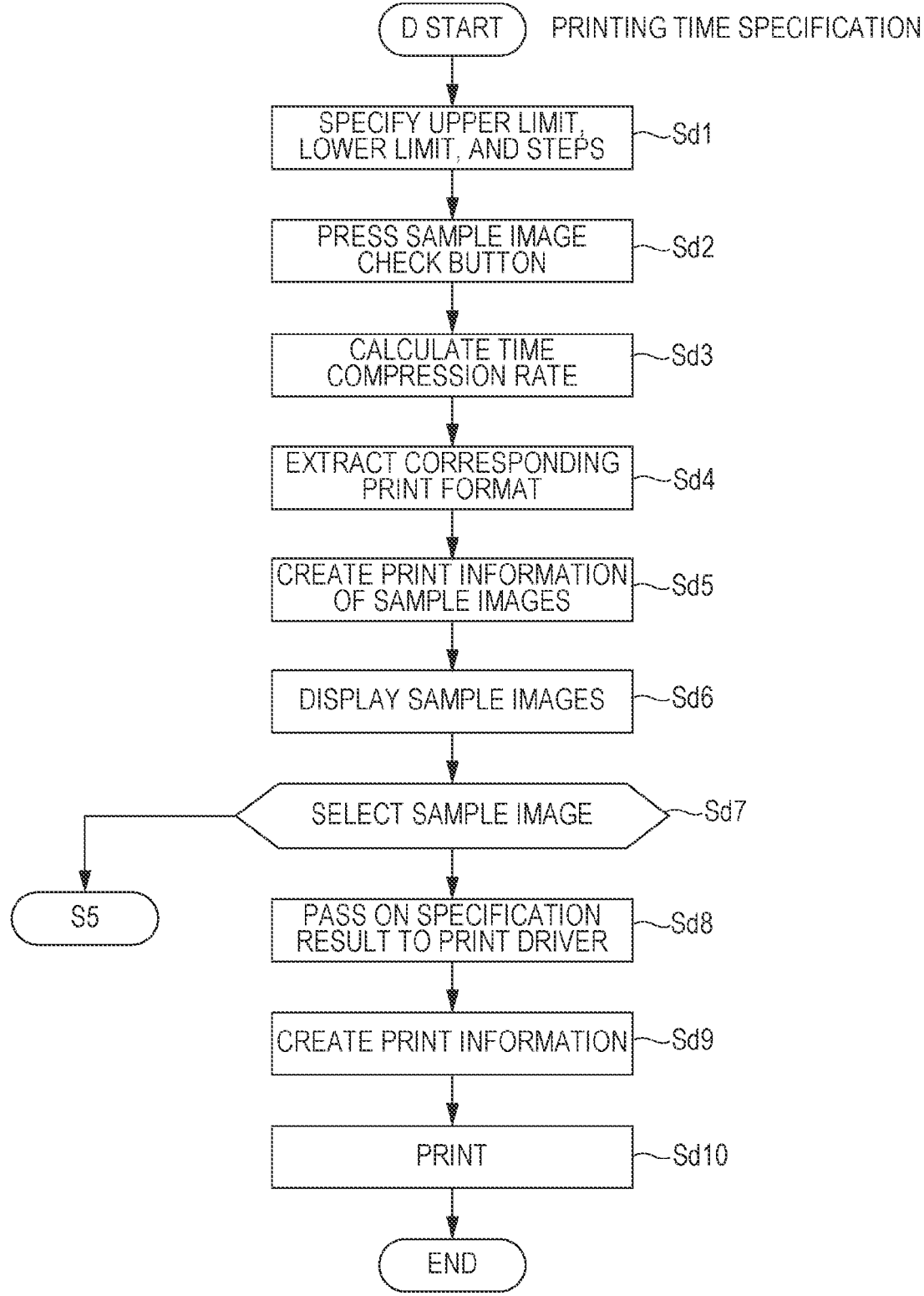
FIG. 14 is a flowchart illustrating printing processes when printing time is specified as a print condition.

When the setting content of the print condition is specified as the printing time, that is, when the check-box of the printing time is checked and the printing time is specified as the first priority of the priority parameter, the process proceeds to process D illustrated in FIG. 14.

FIG. 11 is a flowchart illustrating the printing processes when the print cost is specified as the setting content of the print condition.

First, in the print production settings screen illustrated in FIG. 4, the specification of the print cost (input of the upper limit value of the cost, the lower limit value of the cost, and the number of steps) is performed (step Sa1).

Next, the "sample image check" button is pressed in order to check the sample images corresponding to the specified content (step Sa2).

Hereinafter, for example, description will be given of the flow of a case in which, in the print production settings screen illustrated in FIG. 4, the check-box of the ink cost is checked, the upper limit of the ink cost is set to 120 JPY, the lower limit of the ink cost is set to 80 JPY, the steps is set to 3, and "person" is specified for "specify image" in relation to the print information of a basic ink cost of 135 JPY, and the "sample image check" button is pressed.

The print condition processing module acquires the upper limit and the lower limit of the ink cost, and the steps which are input, and calculates the cost compression rate Rc (step Sa3). Specifically, the upper limit value Rc1 (=88.9%=120/135) and the lower limit value Rc2 (=59.3%=80/135) of the cost compression rate are obtained. The corresponding print formats are extracted from the obtained upper limit value Rc1 and the lower limit value Rc2 (step Sa4). Specifically, the corresponding transformation table LUTs are extracted from the transformation table LUT sets illustrated in FIG. 6. LUTb09, LUTb06, and LUTb08 which corresponds to an intermediate value, are respectively selected from the upper limit value Rc1 (=88.9%) of the cost compression rate, the lower limit value Rc2 (=59.3%) of the cost compression rate, and the number of steps which is three. Since it is necessary to change the resolution in the lower limit value of the specified ink cost, in order to create the sample image, the print condition processing module specifies a change in the resolution to the printer driver.

The print producer (the print condition processing module) passes on the transformation table LUT and the specification of the change in resolution which are extracted to the printer driver, and the printer driver creates the print information for the sample images from the image information (step Sa5).

Next, the print producer uses the image conversion processing module (depiction omitted) to re-convert the print information for the sample images to be possible to display on the display unit 10, and displays the sample images (step Sa6).

The optimal sample image which satisfies the desires of the user is selected from the displayed sample images. Here, when none of the samples satisfy the desires of the user, the "cancel" button in the screen illustrated in FIG. 8 or 9 is pressed, and the process returns to step S5 (step Sa7).

When the optimal sample image which satisfies the desires of the user is selected, the "OK" button in the screen illustrated in FIG. 8 or 9 is pressed, the specification result (the parameters which configure the sample image which is finally selected among the parameters which are specified in the print condition sheet) to be reflected in the print information are passed on to the printer driver (step Sa8), and the printer driver creates the print information (step Sa9).

By returning to the initial screen of the printer driver and executing the printing on this screen, the print information which reflects the specification result is transmitted to the desired printing apparatus 5, and the desired printed object is output (step Sa10). In other words, it is possible to set the print information and the like which is necessary when using the printing apparatus 5 by selecting the sample image, and it becomes possible to easily output the desired printed object from the printing apparatus 5.

FIG. 12 is a flowchart illustrating the printing processes when the ink usage is specified as the setting content of the print condition.

First, when single color is specified in the print production settings screen illustrated in FIG. 4, the "specify single color" check-box is checked, and the ink to be used is specified (steps Sb1 and Sb2). The ink cost of a case in which the printing is performed using the specified ink is displayed on the same screen by the print cost calculation module. The user checks the ink cost (step Sb5). When there is a problem with the cost, the specification is started over.

Next, the "sample image check" button is pressed in order to check the sample images corresponding to the specified content (step Sb6).

When multi-color is specified in step Sb1, the "ink properties" button on the print production settings screen is pressed, and the detailed settings screen (the ink properties screen illustrated in FIG. 5) is displayed (step Sb3).

On the ink properties screen, the specification of whether or not to use each individual ink, and when the ink is used, the usage rate, priority use, and the like is performed (step Sb4). The "recalculate" button is pressed and the print unit cost is checked (step Sb5). When there is a problem with the print unit cost, the specification is started over.

Next, the "sample image check" button is pressed in order to check the sample images corresponding to the specified content (step Sb6).

The print producer (the print condition processing module) passes on the transformation table LUT which is extracted or calculated to the printer driver (step Sb7), and the printer driver creates the print information for the sample images from the image information (step Sb8).

Next, the print producer uses the image conversion processing module (depiction omitted) to re-convert the print information for the sample images to be possible to display on the display unit 10, and displays the sample images (step Sb9).

When the displayed sample images are checked and further changes are necessary, the "cancel" button is pressed, and the process returns to step Sb4 (step Sb10).

When the sample image which satisfies the desires of the user, the "OK" button is pressed, the specification result (the transformation table LUT which is extracted or calculated) which reflects the print information is passed on to the printer driver, and the printer driver creates the print information. By returning to the initial screen of the printer driver and executing the printing on this screen, the print information which reflects the specification result is transmitted to the desired printing apparatus 5, and the desired printed object is output (step Sb11). In other words, it is possible to set the print information and the like which is necessary when using the printing apparatus 5 by selecting the sample image, and it becomes possible to easily output the desired printed object from the printing apparatus 5.

FIG. 13 is a flowchart illustrating the printing processes when the image quality is specified as the setting content of the print condition.

First, the specification of the gradation, the granularity, and the density is performed in the print production settings screen illustrated in FIG. 4 (step Sc1).

Next, the "sample image check" button is pressed in order to check the sample images corresponding to the specified content (step Sc2).

Hereinafter, for example, description will be given of the flow of a case in which, in the print production settings screen illustrated in FIG. 4, the check-box of the image quality is checked, the gradation is specified as "not specified", the granularity as "ordinary", the density as "ordinary", and the image specification as "person", and the "sample image check" button is pressed.

The print condition processing module acquires the input specified information of gradation, granularity, and density and passes on the corresponding printing formats to the printer driver. Specifically, the granularity and the density are fixed to parameters which correspond to "ordinary", and the gradation is a parameter corresponding to three levels, high, ordinary, and low, and the parameters are passed on to the resolution conversion module, the halftoning module, and the interlacing module. In other words, the output of three types of sample image is requested (step Sc3).

The printer driver creates the print information for the sample images from the image information (step Sc4).

Next, the print producer uses the image conversion processing module (depiction omitted) to re-convert the print information for the sample images to be possible to display on the display unit 10, and displays the sample images (step Sc5).

The optimal sample image which satisfies the desires of the user is selected from the displayed sample images. Here, when none of the samples satisfy the desires of the user, the "cancel" button in the screen illustrated in FIG. 8 or 9 is pressed, and the process returns to step S5 (step Sc6).

When the optimal sample image which satisfies the desires of the user is selected, the "OK" button in the screen illustrated in FIG. 8 or 9 is pressed, the specification result (the parameters which configure the sample image which is finally selected among the parameters which are specified in the print condition sheet) to be reflected in the print information are passed on to the printer driver (step Sc7), and the printer driver creates the print information (step Sc8).

By returning to the initial screen of the printer driver and executing the printing on this screen, the print information which reflects the specification result is transmitted to the desired printing apparatus 5, and the desired printed object is output (step Sc9). In other words, it is possible to set the print information and the like which is necessary when using the printing apparatus 5 by selecting the sample image, and it becomes possible to easily output the desired printed object from the printing apparatus 5.

FIG. 14 is a flowchart illustrating the printing processes when the printing time is specified as the setting content of the print condition.

First, in the print production settings screen illustrated in FIG. 4, the specification of the printing time (input of the upper limit value of the time, the lower limit value of the time, and the number of steps) is performed (step Sd1).

Next, the "sample image check" button is pressed in order to check the sample images corresponding to the specified content (step Sd2).

Hereinafter, for example, description will be given of the flow of a case in which, in the print production settings screen illustrated in FIG. 4, the check-box of the printing time is checked, the upper limit of the printing time is set to 8 hours, the lower limit of the print production settings screen is set to 5 hours, the steps is set to 3, and "person" is specified for "specify image" in relation to the print information of a basic necessary basic printing time of 8.5 hours, and the "sample image check" button is pressed.

The print condition processing module acquires the information of each of the upper limit and the lower limit of the printing time, and the steps which are input, and calculates the time compression rate Rt (step Sd3). Specifically, the upper limit value Rt1 (=94.1%=8.0/8.5) and the lower limit value Rt2 (=58.8%=5.0/8.5) of the time compression rate are obtained. The corresponding print formats are extracted from the obtained upper limit value Rt1 and the lower limit value Rt2 (step Sd4). Specifically, the corresponding transformation table LUTs are extracted from the transformation table LUT sets illustrated in FIG. 7. LUTd10, LUTd06, and the intermediate LUTd08, are respectively selected from the upper limit value Rt1 (=94.1%) of the time compression rate, the lower limit value Rt2 (=58.8%) of the time compression rate, and the number of steps which is three. Since it is necessary to change the resolution and the gradation in the lower limit value of the specified printing time, in order to create the sample image, the print condition processing module specifies a change in the resolution and the gradation to the printer driver.

The print producer (the print condition processing module) passes on the transformation table LUT and the specification of the change in resolution and gradation which are extracted to the printer driver, and the printer driver creates the print information for the sample images from the image information (step Sd5).

Next, the print producer uses the image conversion processing module (depiction omitted) to re-convert the print information for the sample images to be possible to display on the display unit 10, and displays the sample images (step Sd6).

The optimal sample image which satisfies the desires of the user is selected from the displayed sample images. Here, when none of the samples satisfy the desires of the user, the "cancel" button in the screen illustrated in FIG. 8 or 9 is pressed, and the process returns to step S5 (step Sd7).

When the optimal sample image which satisfies the desires of the user is selected, the "OK" button in the screen illustrated in FIG. 8 or 9 is pressed, the specification result (the parameters which configure the sample image which is finally selected among the parameters which are specified in the print condition sheet) to be reflected in the print information are passed on to the printer driver (step Sd8), and the printer driver creates the print information (step Sd9).

By returning to the initial screen of the printer driver and executing the printing on this screen, the print information which reflects the specification result is transmitted to the desired printing apparatus 5, and the desired printed object is output (step Sd10). In other words, it is possible to set the print information and the like which is necessary when using the printing apparatus 5 by selecting the sample image, and it becomes possible to easily output the desired printed object from the printing apparatus 5.

Note that, there is a case in which the specified printing apparatus 5 is not satisfactory (for example, a case in which the printing of a satisfactory image may not be obtained at the desired cost, or the like). In this case, there is a case in which it is possible to obtain an improvement by changing the printing apparatus 5. In this case, the process returns to step S3 and the printer selection is changed to the appropriate printing apparatus 5. The print image processing device 100 (the printer driver and the print producer) continue the loading process of the attribute information of the selected printing apparatus 5, the attribute information of the inks which are associated with the printing apparatus 5, the transformation table LUT sets, and the like from the storage unit 30.

As described above, according to the print image processing device, the print image processing system, and the display method of the print image selection screen according to the present embodiment, it is possible to obtain the following effects.

The print image processing device 100 is provided with the input unit 20 to which the print conditions are input, the printer driver which serves as the conversion unit which converts the image information into the print image, and the display unit 10 which displays the sample images in a selectable manner. The sample images which are formed based on the input print conditions are displayed on the display unit 10 in a selectable manner. Since the print image is configured by inputting the print conditions, it is not necessary to repeat a process of trial and error. Since the sample images which are formed based on the input print conditions are displayed, it is possible to easily perform the selection of the print image.

The print conditions include the print cost at which it is possible to provide the printing of the print image. In other words, the sample images which are formed based on the input condition of the print cost are displayed on the display unit 10 in a selectable manner. Therefore, it is possible to easily select the print image of the desired print cost without repeating a process of trial and error in which editing of the print image is performed until the print image of the desired print cost is obtained.

For example, when the user wishes to check only the layout of the printing by actually printing onto the print medium, the user will wish to reduce the print cost as much as possible to execute the printing. In this case, since it is possible to easily select an inexpensive print format with which it is possible to check while viewing the sample image, it is possible to suppress a needless expense.

The print conditions include the attribute information of the inks which can be used in the printing of the print image. In other words, the sample images which are formed based on the attribute information of the inks which can be used are displayed on the display unit 10 in a selectable manner. Therefore, it is possible to easily select the desired print image without repeating a process of trial and error in which editing of the print image is performed based on the usable inks until the desired print image is obtained.

For example, when a specific ink is depleted, and when it is possible to perform the printing and obtain the desired print quality using other inks which complement the depleted ink, it is possible to operate without stopping the print image processing system 1.

When it may not be necessary to use an expensive ink (for example, an ink containing metal for forming a glossy image, a while ink which is used as the undercoat thereof, or the like), it is possible to obtain a reduction in cost by specifying inks not to use.

Since it is possible to set an ink which has a close expiry date to priority use, it is possible to reduce the amount of ink which is wastefully disposed.

Since it is possible to specify a single color of ink, for example, since it is possible to set monochrome printing to use only the black (K) ink, it is possible to easily set printing in which other inks for performing an expression which is close to pure black are not used.

The print conditions include the attribute information of the printing apparatuses 5 which can be used in the printing of the print image. In other words, the sample images which are formed based on the attribute information of the printing apparatuses 5 which can be used are displayed on the display unit 10 in a selectable manner. Therefore, it is possible to easily select the printing apparatus with which it is possible to obtain the desired print image without repeating a process of trial and error in which the printing is attempted using various printing apparatuses 5.

The print conditions include tolerable image quality information which tolerates a reduction in the image quality of the print image. In other words, the sample images which are formed based on the tolerable image quality information which tolerates a reduction in the image quality of the print image are displayed on the display unit 10 in a selectable manner. Therefore, it is possible to easily select the desired print image without repeating a process of trial and error in which editing of the print image is performed until the desired print image is obtained.

For example, when the user wishes to check only the content of the print even if the image quality level of the print is low, or the like, it becomes possible to easily specify the wish to print and confirm such content and to perform the check.

The print image processing device 100 is provided with a plurality of transformation table LUTs in advance which convert the image information into a plurality of levels of print image according to the input print conditions. Therefore, it is not necessary to construct a transformation table LUT whenever necessary according to the input print conditions, and it is possible to easily convert the image information into the print image.

It is possible to specify the order in which the sample images are displayed on the display unit 10 in a selectable manner by specifying the priority parameter as a display condition. In other words, it is possible to perform display of the sample images in a more easy to select manner.

The print image processing system 1 includes the print image processing device 100 which is connected to the printing apparatus 5 via the network 2, and the print image processing device 100 is provided with the input unit 20 to which the print conditions are input, the printer driver which serves as the conversion unit which converts the image information into the print image, and the display unit 10 which displays the sample images in a selectable manner. The sample images which are formed based on the input print conditions are displayed on the display unit 10 of the print image processing device 100 in a selectable manner. Therefore, it is possible to easily perform the selection of the print image to be printed by the printing apparatus 5 which is connected via the network 2.

According to the display method of the print image selection screen of the present embodiment, the sample images which are formed based on the input print conditions are displayed in a selectable manner. Therefore, it is possible to easily perform the selection of the print image.

Note that, in the embodiment described above, as illustrated in FIG. 5, description is given of a configuration in which, for the specification of the ink usage, it is possible to perform the specification of the usage rate for each type of ink other than the basic inks of CMYK; however, the specification of the usage rates may be specified using a numeric range. Specifically, a method may be adopted in which the range specification of the usage rate of the usage upper limit to the usage rate of the usage lower limit, and the specification of the number of steps to display the sample images in the range are performed. Since it is possible to check and select a plurality of sample images to be printed using the specified range of conditions, it is possible to render the selection method more easy.

The entire disclosure of Japanese Patent Application No. 2014-144801, filed Jul. 15, 2014 is expressly incorporated by reference herein.

What is claimed is:

1. A print image processing device, comprising:
an input unit configured to receive print conditions as an input;
a control unit having a CPU and a storage unit, the control unit comprising:
a printer driver configured to create print information for a plurality of sample images, each sample image being a different version of a target print image and being based on the print conditions input to the input unit, wherein the print conditions include print cost information that specifies a range of printing costs; and
a display unit configured to simultaneously display the plurality of sample images, in a selectable manner, based on the print information created by the printer driver using the print cost information; and
a print producer comprising:
a basic information management module configured to register a plurality of transformation tables corresponding to a printing apparatus; and
a print condition processing module configured to select a plurality of transformation tables from the transformation tables registered by the basic information management module, based on the print conditions input to the input unit;
wherein:
the print producer is configured to transmit an indication of which transformation tables were selected to the printer driver, the printer driver is further configured to receive the indication of the selected transformation tables from the print producer, and to create the print information for each respective sample image based on a different one of the selected transformation tables, and the printer driver is further configured to receive a selection of a sample image from the plurality of sample images and to initiate printing of the selected sample image.

2. The print image processing device according to claim 1, wherein the print cost information includes an amount of money or a time of printing at which it is possible to provide printing of the print image.

3. The print image processing device according to claim 2, wherein the print conditions further include at least one of: attribute information of printing apparatuses which can be used in printing of the print image and tolerable image quality information which tolerates a reduction in image quality of the print image.

4. The print image processing device according to claim 1, wherein the print conditions include attribute information of inks which can be used in the printing of the print image.

5. The print image processing device according to claim 1, wherein the print conditions include attribute information of printing apparatuses which can be used in printing of the print image.

6. The print image processing device according to claim 1, wherein the print conditions include tolerable image quality information which tolerates a reduction in image quality of the print image.

7. The print image processing device according to claim 6, wherein the tolerable image quality information includes information of at least one of gradation, granularity, and density of the print image.

8. The print image processing device according to claim 1, wherein the printer driver is further configured to convert image information into a plurality of print images of different levels according to the input print conditions using a plurality of pre-prepared transformation tables.

9. The print image processing device according to claim 1, wherein display conditions are input to the input unit, wherein the display conditions include information which specifies an order in which selection candidates of the print image are displayed on the display unit in a selectable manner, and wherein the display unit is further configured to simultaneously display the plurality of print images based on the display conditions.

10. The device according to claim 1, wherein the printer driver further comprises an image conversion processing module configured to convert the print information for the plurality of sample images into displayable sample images.

11. A print image processing system, comprising:
a print image processing device which is connected to a printing apparatus via a network,
wherein the print image processing device includes:
an input unit configured to receive print conditions as an input,
a control unit having a CPU and a storage unit, the control unit comprising:
a printer driver configured to create print information for a plurality of sample images, each sample image being a different version of a target print image and being based on the print conditions input to the input unit, wherein the print conditions include print cost information that specifies a range of printing costs; and
a display unit configured to simultaneously display the plurality of sample images, in a selectable manner, based on the print information created by the printer driver using the print cost information; and
a print producer comprising:
a basic information management module configured to register a plurality of transformation tables corresponding to a printing apparatus; and
a print condition processing module configured to select a plurality of transformation tables from the transformation tables registered by the basic information management module, based on the print conditions input to the input unit;
wherein:
the print producer is configured to transmit an indication of which transformation tables were selected to the printer driver,
the printer driver is further configured to receive the indication of the selected transformation tables from the print producer, and to create the print information for each respective sample image based on a different one of the selected transformation tables, and
the printer driver is further configured to receive a selection of a sample image from the plurality of sample images and to initiate printing of the selected sample image.

12. The system according to claim 11, wherein the printer driver further comprises an image conversion processing module configured to convert the print information for the plurality of sample images into displayable sample images.

13. A print image processing device, comprising:
an input unit configured to receive print conditions as an input;
a control unit having a CPU and a storage unit, the control unit comprising:
a printer driver configured to create print information for a plurality of sample images, each sample image being a different version of a target print image and being based on the print conditions input to the input unit, wherein the print conditions include print cost information that specifies a range of printing costs; and
a display unit configured to simultaneously display the plurality of sample images, in a selectable manner, based on the print information created by the printer driver using the print cost information, wherein:
the printer driver is further configured to receive a selection of a sample image from the plurality of sample images and to initiate printing of the selected sample image, and
the display unit is further configured to:
display the plurality of sample images in an arrangement in which a sample image corresponding to an upper limit of the range of printing costs is located in an upper left area of the arrangement, and a sample image corresponding to a lower limit of the range of printing costs is located in a lower right area of the arrangement; and display the plurality of sample images in the selectable manner such that selecting one of the plurality of sample images causes the display unit to display the selected one of the plurality of sample images in an enlarged manner.

* * * * *